INVENTOR
ALFRED C. SCHROEDER
BY [signature]
ATTORNEY

COLOR TELEVISION APPARATUS

Filed Oct. 30, 1946 2 Sheets-Sheet 2

INVENTOR
ALFRED C. SCHROEDER
BY H. G. Grover
ATTORNEY

Patented Dec. 26, 1950 2,535,552

UNITED STATES PATENT OFFICE 2,535,552

COLOR TELEVISION APPARATUS

Alfred C. Schroeder, Feasterville, Pa., assignor to Radio Corporation of America, a corporation of Delaware Application October 30, 1946, Serial No. 706,613

3 Claims. (Cl. 178—5.4)

My invention relates in general to the art of television transmission and reception and more particularly to methods for the transmission and reception of television in color.

At the present time, color television transmission is accomplished in two ways. In one method, the image is scanned and the elemental area components thereof are sequentially, field by field, broken down or analyzed into the so-called additive primary colors of red, green and blue. A field of the red component color, for instance, will be transmitted followed by a field of the green component color, this to be followed by a field of the blue component color, or the order may be changed as desired but a uniformly repeating sequence is desired. Transmission is accomplished by the sequential transmission of each of the fields representing one of the selected primary or component colors. On the other hand, it is possible, by employing several optical representations of the image to be televised, simultaneously to break down the image into its several component colors, and to transmit these representations simultaneously. This is the simultaneous type of transmission employed in color television, as contrasted with the sequential type. It is to the simultaneous type of transmission system that the method of this invention relates. It is, therefore, an object of this invention to provide an improved type of simultaneous color multi-additive type of television transmission wherein greater fidelity of recording is possible with simplified components as compared to a so-called sequential system.

One of the disadvantages of the present types of simultaneous multi-color television transmission methods is that the frequency spectrum, which is necessary for the transmission, is undesirably broad. As television operating frequency bandwidths are presently assigned, this factor limits the number of stations which can be set up within a particular spectrum in a particular area. Again, it will be appreciated that the broader the frequency spectrum involved in the transmission, the broader must be the tuning range of the receiver which is receiving the transmission, and the attendant difficulties in making receiver transmission exceptionally broad are too well known to need discussion here. Anything which can be done to compress the frequency band utilized in a transmission is considered a step in the right direction, unless what is done introduces more and undesired technical problems and decreases the efficiency of operation and the end result obtained thereby. Accordingly, it is another of the objects of my invention to provide a method of simultaneous multi-color television transmission in which the frequency spectrum will be more economically used with the attendant benefits which accrue therefrom.

In addition to providing a method for the more economical use of the frequency spectrum in color television transmission, it is another of the objects of my invention to provide a method wherein additional intelligence in the form of accompanying sound and/or facsimile signal transmission or other signals may be transmitted while at the same time providing a more economical use of the frequency spectrum.

Other objects will become apparent to those skilled in the art from an examination of the hereinafter appended specification.

It has been found that the detail resolving power of the human eye differs for various colors. Since this is a phenomenon of nature, it is not necessary to have pictures or images of equal detail resolution in each of the three selected component or primary colors of an additive multicolor television system. The detail resolving power of the human eye, in so far as the primary colors are concerned, is less for the blue components of an image than for either the red or the green components. Therefore, it will be appreciated that there need not be as many details accompanying the blue component color signal transmitted to represent the image as there should be of the green or the red, since the human eye depends upon, and resolves, the green and red components of an image to a much higher degree of delineatory detail and to a considerably greater degree than for the blue components. Again, since the average picture does not contain as much in the way of pure red detail as it usually does of green detail, in this invention the band widths utilized for the transmission of the red detail is greater than that utilized in transmitting the blue component detail but is not as great as the band width utilized, in accordance with my invention, with the transmission of the green component detail. Since the width of the frequency band covered in the transmission of each of these component color signals is proportional to the detail transmitted, it will be appreciated that where two component colors can be transmitted with a lesser delineatory degree than the third component color, a consequent reduction of the frequency band required for the transmission of two of the component color signals will result in a consequent economy of use of the frequency spectrum in a simultaneous additive multicolor type of television transmission.

To this end, the three selected component color image signals may be generated in three separate cameras and the signals then may be conveyed to suitable transmission channels by suitable and well known methods. One such method, which will be explained hereinafter in this specification, involves the development of three carriers which are individually and separately modulated by one of the selected component color signals and then all three carriers are simultaneously transmitted. The frequency of these carriers is spaced apart in the spectrum in a manner so that there is no overlapping of the side bands transmitted and representing each component color of the image undergoing televising. This will be seen more clearly by referring to the drawings of this application.

In another method which may be utilized, signals are developed in three separate light sensitive signal developing means, which in this case have been individual cameras, and the signals from each of two of the cameras have been used to modulate generated subcarriers and a single transmitter may have the carrier frequency thereof modulated directly by the signals from one of the cameras and by the two modulated subcarriers. Appropriate side band filters are provided in each of these methods so that the complete range of side bands is not transmitted but only one of the side bands is transmitted along with a vestigial side band for each of the component colors. In this application the blue image detail is transmitted with the least degree of detail resolution, and the red component detail is transmitted with a degree of resolution which is less than that of the green component detail, the detail of the latter component image being transmitted so as to approach as nearly as possible black and white image standards. It should be appreciated that the term "transmit" in this application does not contemplate a limitation to the radiant type of transmission. Once the signals are developed representing each of the color components and with varying degrees of image detail resolution, they may be conveyed to a utilization apparatus by any suitable and well known means. This might be by the radiation of one or more modulated carrier frequencies, or by conduction by apparatus such as coaxial cables or other appropriate conducting means. This term, therefore, is used in its broad sense in this application. My invention will best be understood by reference to the drawings in which, Fig. 1 is a schematic block diagram illustrating one method of practicing my invention;

Figure 1:
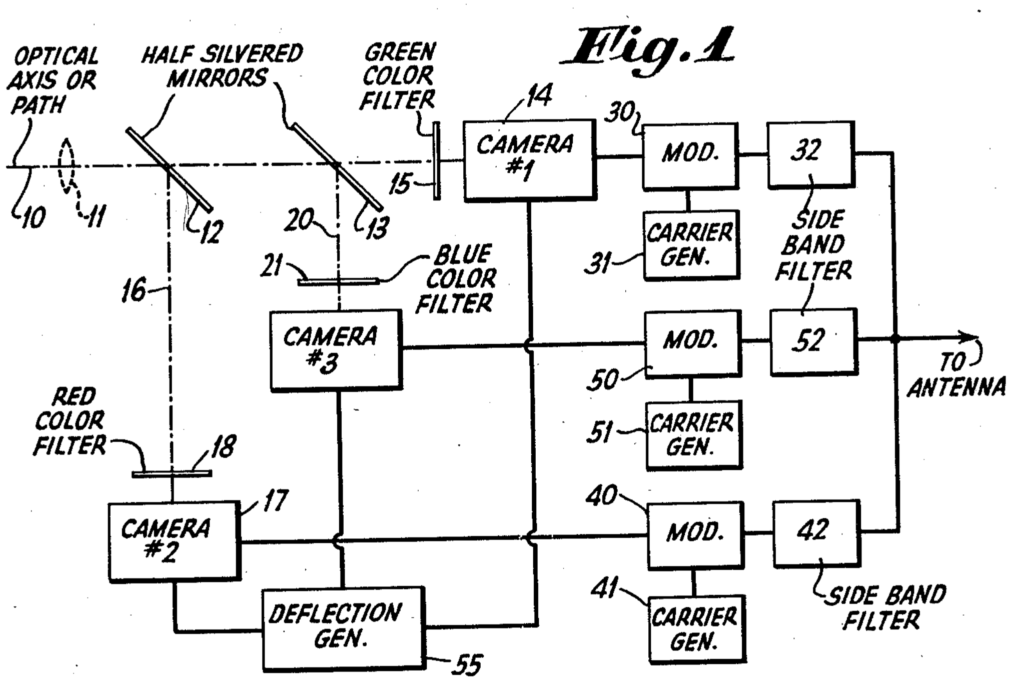

Referring first to Fig. 1, there is shown a schematic block diagram illustrating one method of practicing my invention and it is assumed, for purposes of illustration, that the eye can resolve the detail of the green component of a picture best, the detail of the red component of the picture next, and the detail of the blue component of the picture least.

Firstly, it is passed through a mirror 12 which is either a dichroic mirror, or a so-called half-silvered mirror, the latter being generally termed a partially transparent reflecting mirror and, in actual practice, it would be one-third silvered. The image then passes through a second mirror 13, which may be of the dichroic or half-silvered type, and is directed thence to a device for converting the optical image into electrical signals representative thereof and which, in this case, comprises a camera which is identified as camera #1. Interposed along the optical axis of the light transmission path between the camera 14 and the optical image source is a color filter member 15 which, in this instance, may be assumed, for illustrative purposes, to comprise the green color filter. The purpose of this filter, as is known, is to pass only the green components of the optical image to camera #1 for scansion purposes.

The optical image, upon its impingement on mirror 12, is divided into two optical images, one of which is represented by the light rays passing through to the camera 14 along a line coincident with the optical axis 10 and the other of which is represented in the drawing as being along a path 16 as the light image is reflected from mirror 12. The mirror 12 in this illustration is positioned at a 45° angle with respect to the optical axis 10, and therefore the path 16 will be located at right angles to the path 10. The second image so formed is directed into camera #2, otherwise identified as element 17, for scansion purposes, the latter camera being adapted to develop a signal which is assumed to be representative of the red component color of the optical image to be scanned due to the interpositioning of a suitable red filter 18 in the light path to the camera #17 in order to transmit only the red component color of the image to the camera #2 for scansion purposes.

The optical image which passes through the mirror 12 impinges on the mirror 13 where a portion of the image will pass through to camera #1. Another image is reflected from the surface of mirror 13, which is positioned at an angle of 45° with respect to the optical axis 10, so as to pass along an optical path 20 to camera #3 for scansion purposes.

Interposed between camera #3 and the partially reflecting transparent member 13 is a color filter member 21 whose purpose it is to allow passage of the third component color of an additive tricolor system, namely the "blue" light components, so that the light image directed into camera #3 for scansion is the third of the normally selected three colors.

Since the degree of detail will be represented by the higher frequency components from each of the cameras, it will be appreciated that the signals developed by each of the cameras may be passed through an appropriate electrical filter network which will cut out the higher frequency components to a desired degree. In the case of the signal representing the green component of the image, it will not be necessary to use such a filter arrangement since it is desired that the green component of the picture approach black and white picture standards as closely as possible. On the other hand, some of the higher frequency components may be deleted from the signals representing the red image detail and even more of the frequency components may be deleted from the signal representing the blue component detail. In this manner, the degree of resolution of detail of the image represented by each of these signals may be controlled to any desired degree.

It has been indicated in the drawing that three separate cameras may be used. It will be appreciated that by a camera is meant an instrument which will scan an optical image and develop signals representative thereof. All of these three units might, in fact, be maintained within the same housing or container if so desired. Again, the term "camera" may include the necessary control apparatus that goes along with a television scansion unit such as deflecting apparatus, preamplifiers, and even may be regarded as including a video and line amplifier or the like where the output signal requires any great amount of amplification. It will also be appreciated that the filters covering the color detail resolution of each of the cameras may be included within the camera itself and, accordingly, these have not been indicated as separate elements in the drawing.

The signal output of camera #1 may be fed to a modulator unit 30 which has fed thereto a carrier frequency generated by any suitable form of carrier frequency generator 31, and this frequency may be termed the frequency $f_1$. The modulator unit will have, in the output circuit thereof, the carrier frequency and two side bands which are formed by the modulation of the carrier frequency. Since, as indicated hereinafter in Fig. 3, it is desired that only one side band be radiated or transmitted in its entirety, the signal is next fed through a vestigial side band filter 32 whose purpose is to partially suppress one of the side bands. Such filters are well known in the art in which this case belongs and, accordingly, no detailed explanation thereof will be given here. Thus, one signal to be radiated or transmitted is formed and for all practical purposes may be considered substantially like the now normally transmitted signal used for black and white transmission.

The red component color image, which is passed to camera #2, will be scanned and some of the higher frequency components of the output signal will be deleted by the electrical filter contained in the camera. Accordingly, the output from the camera may be regarded as a component color signal which, if reproduced, would not give the color image detail to the same degree of resolution as, for instance, the green component color signal. The output of the camera is fed to a modulator unit 40, similar to the modulator 30, the modulator having fed thereto a carrier frequency $f_2$ developed by carrier generator 41. Again, there will be present in the output from the modulator a carrier signal with two side bands. The signal is passed through side band filter member 42 whose purpose is to partially suppress one of the side bands which has been formed. A reference to Fig. 3 will show that the frequency $f_2$ is so chosen that, after partial suppression of one of the side bands in a manner such as above explained, for instance, the green component color signal and the red component color signal will be spaced apart to a slight degree to allow the interposition in the frequency spectrum of a sound carrier.

The blue component color image which is scanned by camera #3, and in which the color detail has been de-emphasized, will develop a signal which is fed to a modulating unit 50 having fed thereto a frequency $f_3$ from carrier generator 51. Again, there will be formed a carrier with two side bands and this signal is fed to side band filter 52, where one of the side bands is partially suppressed, as above explained, and the frequency is selected so that, after partial suppression of the side band, the signal will be positioned in the frequency spectrum closely adjacent the extremity of one of the side bands of the red component color signal.

Also in this figure is indicated, in purely schematic form, a deflection control generator 55 for furnishing deflection potentials to the deflecting apparatus associated with the scanning tube in each of the cameras.

One generator only has been indicated for purposes of simplicity and to indicate the fact that some common control is desirable, whereas, in actual practice, separate generators would necessarily have to be provided for deflecting the cathode ray beam in the scansion tubes in both the vertical and horizontal coordinates of movement.

The figure indicates the feeding of all three of the signals simultaneously to one or more antennas. It will be appreciated that these signals could be conducted to utilization apparatus by means of coaxial cables and other types of conductors.

Figure 2:
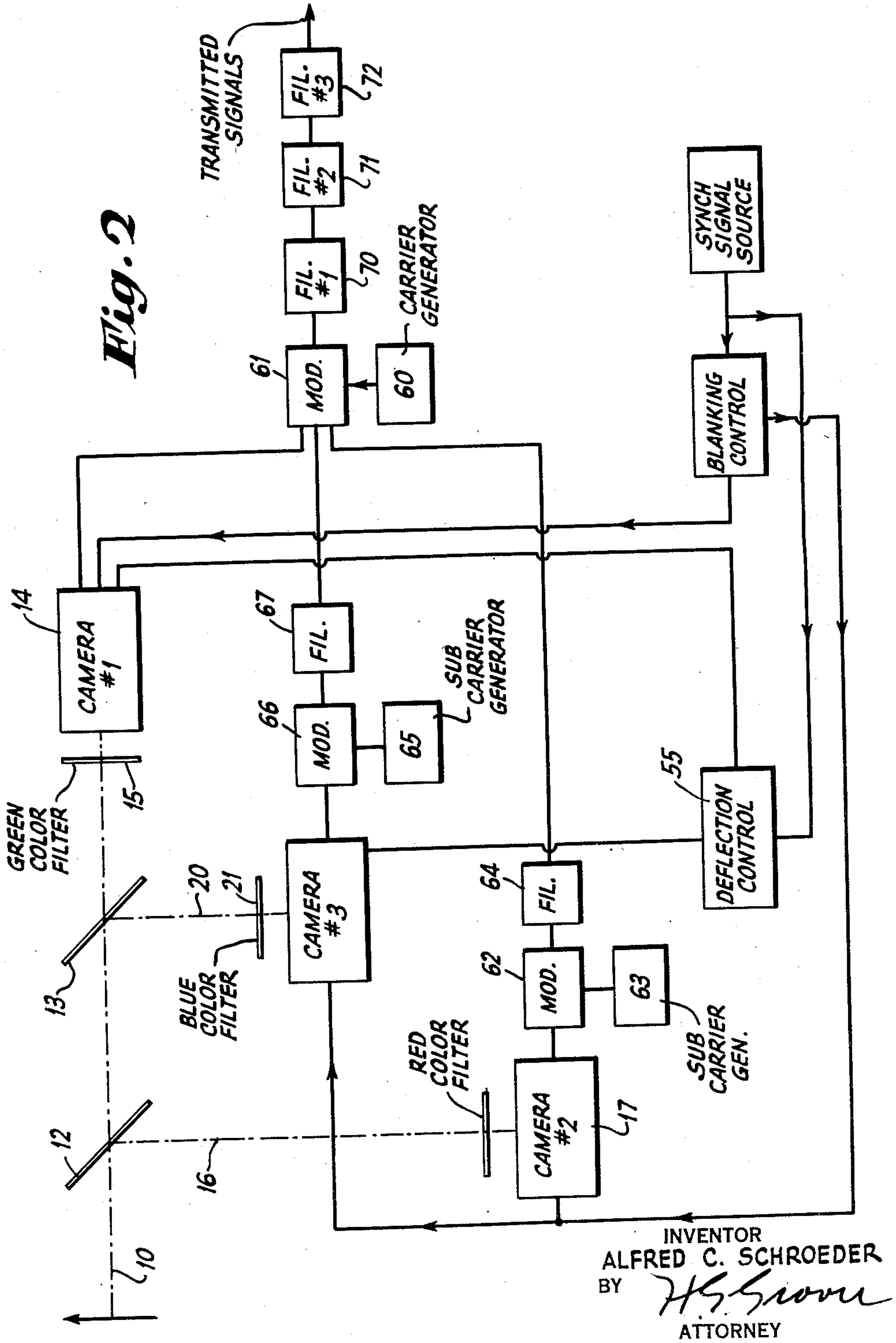
Fig. 2 is a block diagram illustrating another method of practicing my invention and which is a modification of the method of Fig. 1.

Referring to Fig. 2, there is shown a block diagram which will illustrate another method of practicing my invention. This differs from the method of Fig. 1 in that instead of using three separate carrier frequencies, a single carrier frequency could be used and position displacement in the spectrum between the component color signals could be accomplished through the use of subcarriers in the case of two of the sets of signals. In this arrangement, there is provided a single main carrier generator 60 feeding to a modulator 61. The output signals from camera #1 which represent the green component color of the image being televised may be fed directly to the modulator unit 61.

The output signals which are derived from camera #2 may be fed to a modulator 62 which has furnished thereto energy from subcarrier frequency generator 63. There will result a modulated subcarrier with a pair of side bands. One of these side bands may be partially suppressed by filter 64 and the output of this filter then may be fed to modulator unit 61. The subcarrier frequency is selected so that the signal from filter 64 which modulates the main carrier 60 will be spaced apart from the green component color signal so that its position relative to the main carrier will be such as indicated hereinafter in Fig. 3.

Similarly, the detail de-emphasized signal from camera #3 may be fed to a modulator 66 which has furnished thereto subcarrier wave energy from subcarrier generator 65. Again, there will be formed a sub carrier frequency having two adjacent side bands and this signal may be fed to filter 67 in order to partially suppress one of the side bands. The output of the filter 67 then is fed to the main modulator 61.

The output of the modulator unit 61 is fed through three filters, 70, 71, and 72 respectively, which have been identified in the drawings as filters #1, #2, and #3. The purpose of the filters is as follows:

Assuming that the signal from camera #1 is fed to the modulator 61 and further assuming that the highest frequency of the signal from camera #1 is the frequency A, there will be put out from modulator 61 one signal which comprises the frequency $f_4$ of carrier generator $60 \pm A$. Since it is desired to partially suppress one of these side bands so formed, the signal may be fed through filter 70 which will accomplish this object. If it be assumed that the highest frequency put out by camera #2 is B and the frequency of subcarrier 63 is $f_5$, then the signal passed to filter 64 will be $f_5 \pm B$. The output of filter 64 will be $f_5 + B$ and $f_5$ minus a frequency C since the filter has only partially suppressed one side band. Accordingly, since the output of filter 64 is impressed on the modulator 61, the output of modulator 61 will also bear two side bands which are $f_4 \pm f_5$ with one complete side band and a partially suppressed side band. The frequency $f_4 \pm f_5$ with its attendant side bands may be suppressed by means of filter #2.

The function of filter 3 is to accomplish the deletion of one side band formed when the signals from filter 67 are impressed onto the main modulator 61. The signals after passing through the three filters then may be transmitted to utilization apparatus. In this figure, the blanking control unit and the synchronizing signal source have been indicated in addition to the deflection control.

While this arrangement, as it is shown in these figures has some advantages over the arrangement according to Fig. 1, it suffers from the disadvantage relative to the arrangement of Fig. 1 that the percentage modulation of the carrier frequency by each component color is not as great in the arrangement of this figure as is true of the arrangement of Fig. 1.

Figure 3:
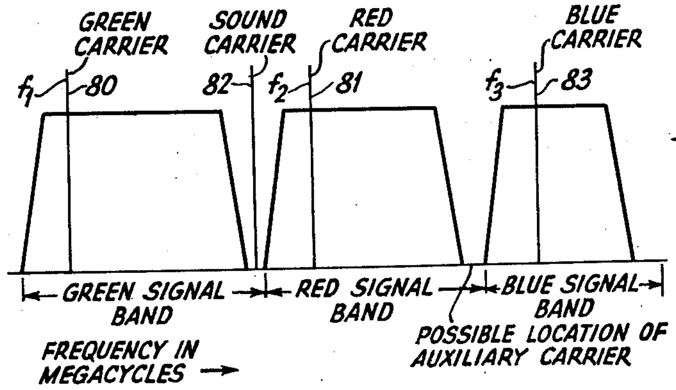
Fig. 3 is an explanatory curve showing transmitter characteristics and signal band spacing in accordance with my invention.

Referring to Fig. 3, there is shown an explanatory curve representing the transmitter characteristic of a transmitter operating in accordance with the method disclosed by this invention. Since the detail of the green representation of the image undergoing televising should be the greatest, according to the assumption herein made, the band spread representing this component color will be the widest. One of the side bands of this carrier may be at least partially suppressed and the relative coverage of the side bands formed by the modulation of the carrier by the signals developed by camera #1 is represented by the relative width of the side bands on either side of the carrier and which has been identified by the numeral 80.

The frequency of the carrier from the unit 41 has been selected so that one of the side hands formed with respect to the transmitter carrier is out of the range of the side bands representing the green component of the image. For purposes of clarity, it has been illustrated that one of the side bands so formed has been partially suppressed and the other, or major side band, is without the range of the signals representing the green component color of the image. The displacement between the side bands representing the green component color of the image and the red component color of the image may be such that between the side bands there is space enough to radiate a carrier carrying the representations of the sound accompanying the image undergoing televising. Since the detail of the red component color need not be as great as the detail of the green component color of the image, the total band radiated which is representative of the red component can be less than that radiated and representing the green component of the image being televised. The red carrier which has been modulated with the picture detail has been identified by the numeral 81 and the space between the partially suppressed side band of the red carrier and the major side band of the green carrier is displaced sufficiently to allow the interposition therebetween of the sound carrier identified by the numeral 82.

The blue carrier has been identified by the numeral 83 and is selected with respect to the carriers 80 and 81 so that it is displaced in the spectrum with respect to the signals representing the other two primary colors. In the light of our assumption of the inability of the human eye to evaluate blue detail to the degree that it can either be the red or the green, the developed detail or resolution of the blue can be less than that of the red and green components and therefore the modulating band of frequencies representing the blue component of the image can be less than that of the red or green and hence narrower in the frequency spectrum. The partially suppressed side band representative of the blue component is displaced slightly in position in the frequency spectrum with respect to the major side band of the red carrier and between there is a space in the spectrum which may be utilized for the interposition of signals which might, for instance be facsimile signals or the like.

Figure 4:
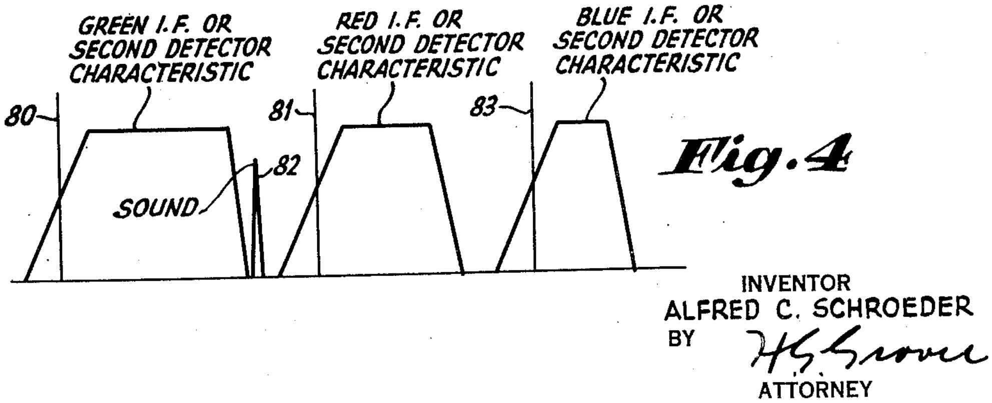
Fig. 4 is an explanatory curve showing a representative reproducer characteristic as used in practicing my invention.

Referring to Fig. 4, there is shown a representative characteristic of a television receiver for reproducing the signals radiated from a transmitter apparatus operating in accordance with the method hereinbefore described. The characteristic of the intermediate frequency amplifiers or the second detectors of the receiver for reproducing the color component signals is illustrated with respect to the carriers as represented in Fig. 2 and the carriers have been labeled with the same reference numerals.

Since the green characteristics are made to be the same as would be maintained if black and white standards were used including the spacing between video and sound carriers so that a black and white receiver can pick up and reproduce the green signal and the red signal can be less detailed and the blue can have the lowest resolution of all, the bands of these three colors can be arranged in that order with respect to the transmitter carrier so that any band cutting by the radio frequency circuits or the overall intermediate frequency characteristics will affect the blue only.

In the embodiment of the invention hereinbefore described the color filters may be of the so-called Wratten type of filter and the green filter might be the filter member 58, the blue might be filter member 47 and the red might be filter member 25, for example.

It will be appreciated that the optical paths of the three component color images from lens 10 to each of the cameras should be the same. For ease of illustration this has not been done in Fig. 1; however these paths have been made equal in the drawing in Fig. 2.

Having thus described the invention, what is claimed and desired to be secured by Letters Patent is the following:

1. A color television transmission system comprising in combination a plurality of image pick up devices each responsive only to a different selected component color image, a radio frequency carrier signal generator for each of said image pick up devices, signal modulating means connecting each of said image pick up devices with a carrier signal generator for modulating each carrier in accordance with signals representative of the different selected component color images, a carrier signal radiating system for all the modulated carrier signals and a separate band-pass filter connected to pass each of the modulated carrier signals to said signal radiating system, said band-pass filters each passing only the carrier and equal but relatively small fractional parts of the frequency range of one side band and unequal but relatively large fractional parts of the other side band of the modulated carrier to which it is responsive.

2. A color television transmission system comprising in combination a plurality of image pick up devices each responsive only to a different selected component color image, a radio frequency carrier signal generator for each of said image pick up devices, signal modulating means connecting each of said image pick up devices with a carrier signal generator for modulating each carrier in accordance with signals representative of the different selected component color images, a carrier signal radiating system for all the modulated carrier signals and a separate vestigial side band filter connected to pass each of the modulated carrier signals to said signal radiating system, said vestigial side band filters responsive only to unequal frequency band widths.

3. A color television transmission system comprising in combination a plurality of image pick up devices each responsive only to a different selected component color image, a radio frequency carrier signal generator for each of said image pick up devices, signal modulating means connecting each of said image pick up devices with a carrier signal generator for modulating each carrier in accordance with signals representative of the different selected component color images, a carrier signal radiating system for all the modulated carrier signals and a separate band-pass filter connected to pass each of the modulated carrier signals to said signal radiating system, said band-pass filters each passing only the carrier and equal but relatively small fractional parts of the frequency range of one side band and unequal but relatively large fractional parts of the other side band of the modulated carrier to which it is responsive, and wherein the band-pass filter designated to pass a green component color image representative signal passes the wider frequency range of any of the pass bands.

ALFRED C. SCHROEDER.

REFERENCES CITED

The following references are of record in the file of this patent:

UNITED STATES PATENTS

| Number | Name | Date |
|---|---|---|
| Re. 20,700 | Carlson | Apr. 19, 1938 |
| 2,236,501 | Goldsmith | Apr. 1, 1941 |
| 2,301,395 | Goldsmith | Nov. 10, 1942 |
| 2,319,789 | Chambers | May 25, 1943 |
| 2,335,180 | Goldsmith | Nov. 23, 1943 |
| 2,375,966 | Valensi | May 15, 1945 |